United States Patent
Tsuji et al.

(10) Patent No.: US 11,396,889 B2
(45) Date of Patent: Jul. 26, 2022

(54) SUPERCHARGER AND MOTOR COOLING METHOD

(71) Applicant: Mitsubishi Heavy Industries Marine Machinery & Equipment Co., Ltd., Nagasaki (JP)

(72) Inventors: Takeshi Tsuji, Nagasaki (JP); Keiichi Shiraishi, Nagasaki (JP)

(73) Assignee: MITSUBISHI HEAVY INDUSTRIES MARINE MACHINERY & EQUIPMENT CO., LTD., Tokyo (JP)

( * ) Notice: Subject to any disclaimer, the term of this patent is extended or adjusted under 35 U.S.C. 154(b) by 665 days.

(21) Appl. No.: 15/115,633

(22) PCT Filed: Feb. 20, 2015

(86) PCT No.: PCT/JP2015/054750
§ 371 (c)(1),
(2) Date: Jul. 29, 2016

(87) PCT Pub. No.: WO2015/125910
PCT Pub. Date: Aug. 27, 2015

(65) Prior Publication Data
US 2017/0167511 A1  Jun. 15, 2017

(30) Foreign Application Priority Data

Feb. 24, 2014 (JP) ............................. JP2014-032907

(51) Int. Cl.
*F04D 29/58* (2006.01)
*F04D 25/06* (2006.01)
(Continued)

(52) U.S. Cl.
CPC .......... *F04D 29/5806* (2013.01); *F02B 33/40* (2013.01); *F02B 37/04* (2013.01);
(Continued)

(58) Field of Classification Search
CPC .......... F02B 33/40; F02B 37/04; F02B 37/10; F02B 39/005; F04D 13/0646;
(Continued)

(56) References Cited

U.S. PATENT DOCUMENTS 3,077,731 A * 2/1963 Addie ..................... F02B 33/00
60/599
5,289,683 A * 3/1994 Kurihara ............. F02D 41/0007
60/602
(Continued)

FOREIGN PATENT DOCUMENTS

EP 2666989 A1 * 11/2013 ......... F02M 35/1216
EP 2229515 B1 9/2015
(Continued)

OTHER PUBLICATIONS

Korean Office Action, App. No. 10-2016-7017140, dated Sep. 18, 2017, 10 Pages.
(Continued)

*Primary Examiner* — Dominick L Plakkoottam
*Assistant Examiner* — Charles W Nichols
(74) *Attorney, Agent, or Firm* — Berkeley Law & Technology Group, LLP (57) ABSTRACT

Provided is an electric-assist supercharger configured such that a motor (30) is attached to the end portion of a rotor shaft (15) close to a silencer (26), the rotor shaft (15) being connected to a compressor portion. Such a supercharger includes a suction air introduction path (24) formed in the silencer 26 such that a main suction air flow flows in the radial direction of the silencer (26) toward a connection portion between the silencer (26) and the compressor portion, and a cooling air intake path (40) formed in the silencer (26) in which at least an outlet thereof is on the center axis of the rotor shaft (15).

7 Claims, 5 Drawing Sheets

(51) Int. Cl.
  *F04D 29/42* (2006.01)
  *F04D 17/10* (2006.01)
  *F04D 29/66* (2006.01)
  *F02B 37/04* (2006.01)
  *F02B 33/40* (2006.01)
  *F04D 29/063* (2006.01)
  *F02B 39/00* (2006.01)
  *F02B 37/10* (2006.01)
  *F04D 25/02* (2006.01)

(52) U.S. Cl.
  CPC ............ *F02B 37/10* (2013.01); *F02B 39/005* (2013.01); *F04D 17/10* (2013.01); *F04D 25/024* (2013.01); *F04D 25/06* (2013.01); *F04D 25/0606* (2013.01); *F04D 29/063* (2013.01); *F04D 29/4206* (2013.01); *F04D 29/663* (2013.01); *Y02T 10/12* (2013.01)

(58) Field of Classification Search
  CPC ...... F04D 13/0653; F04D 17/10; F04D 25/04; F04D 25/045; F04D 25/0606; F04D 29/4213; F04D 29/403; F04D 29/582; F04D 29/58; F04D 29/5806; F04D 29/063; F04D 29/663; F04D 29/70; F04D 29/701; F04D 25/024; F04D 25/06; F04D 29/4206; Y02T 10/12
  See application file for complete search history.

(56) References Cited

U.S. PATENT DOCUMENTS

| | | | |
|---|---|---|---|
| 6,305,169 | B1 | 10/2001 | Mallof |
| 6,736,238 | B2 * | 5/2004 | Kerr ...................... F04D 29/663 |
| | | | 181/229 |
| 2003/0223892 | A1 | 12/2003 | Woolenweber |
| 2012/0104884 | A1 * | 5/2012 | Wagner .................... H02K 1/32 |
| | | | 310/54 |
| 2013/0239568 | A1 * | 9/2013 | Krishnan ................ F02B 37/12 |
| | | | 60/608 |
| 2014/0144412 | A1 | 5/2014 | An et al. |

FOREIGN PATENT DOCUMENTS

| | | |
|---|---|---|
| JP | S56049299 U | 5/1981 |
| JP | S57191895 U | 12/1982 |
| JP | S62096772 A | 5/1987 |
| JP | H03115737 A | 5/1991 |
| JP | 2005315218 A | 11/2005 |
| JP | 2011509374 A | 3/2011 |
| JP | 4959753 B | 6/2012 |
| JP | 2013019355 A | 1/2013 |
| KR | 20100102687 A | 9/2010 |
| KR | 20110139372 A | 12/2011 |
| WO | 2013011840 A1 | 1/2013 |

OTHER PUBLICATIONS

International Search Report, App. No. PCT/JP2015/054750, Filed Feb. 20, 2015, dated May 26, 2015, 7 Pages.

Written Opinion of the International Searching Authority, App. No. PCT/JP2015/054750, Filed Feb. 20, 2015, dated May 26, 2015, 15 Pages.

* cited by examiner

SUPERCHARGER AND MOTOR COOLING METHOD

TECHNICAL FIELD

The present invention relates to a supercharger and a motor cooling method.

BACKGROUND ART

Typically, a supercharger has been known, which is configured to compress combustion air of an internal combustion engine to send high-density air to a combustion chamber. Such a supercharger has been broadly used for a two-stroke low-speed engine such as a marine diesel engine and a power generation diesel engine, or the other types of engines. In this supercharger, a compressor configured to compress combustion air and a turbine serving as a drive source of the compressor are connected to a rotor shaft, and are housed in a casing, to rotate together. Note that the turbine is driven by the energy possessed by exhaust gas of the internal combustion engine.

A hybrid supercharger configured such that a high-speed motor generator is connected to a rotor shaft has been known as the above-described supercharger. This hybrid supercharger can supply an internal combustion engine with the combustion air compressed in a manner similar to that of a typical supercharger, and can generate power using surplus exhaust gas energy to supply the power. Note that in the case of placing the motor generator of the hybrid supercharger in a compressor-side silencer, the motor generator has typically such a size that the motor generator penetrates the silencer.

Moreover, an electric-assist supercharger has been known, which employs and includes a downsized motor instead of the motor generator of the hybrid supercharger as described above. In this electric-assist supercharger, the downsized motor is attached to an extension extending from a rotor shaft toward a suction air introduction path. In this case, since the size of the motor is small, the weight of a motor rotor can be sufficiently supported by an existing supercharger bearing, and therefore, a dedicated bearing for the motor is not necessary. That is, a motor overhang structure without the dedicated bearing for the motor is typically employed. For example, in the case of an insufficient volume of exhaust gas in a main engine low-load state, the above-described electric-assist supercharger lacks the pressure of scavenging to a main engine. For this reason, power is applied to the motor instead of use of a typical auxiliary blower, and driving of a compressor is assisted by additional driving force of the motor.

Moreover, Patent Literature 1 described later discloses a control technique of circulating oil as a cooling medium to cool a motor for the purpose of preventing overheating of the motor used for an electric supercharger.

CITATION LIST

Patent Literature

{PTL 1}

The Publication of Japanese Patent No. 4959753

SUMMARY OF INVENTION

Technical Problem

Some of the motors of the electric-assist superchargers described above employ the motor overhang structure without the dedicated bearing for the motor. In this motor overhang structure, the motor rotor of the downsized motor is attached to the extension of the rotor shaft of the supercharger. For this reason, it is not necessary to provide the dedicated bearing at the motor rotor, and the structure supported by a bearing (a bearing of the rotor shaft) supporting a supercharger body is employed.

According to Patent Literature 1, in order to prevent overheating of the motor, oil (lubricant) supplied to the bearing circulates to cool the motor. However, in the electric-assist supercharger with the motor overhang structure, no dedicated bearing for the motor is provided. For this reason, lubricant cannot be used as the cooling medium for the motor, and therefore, for example, the method for cooling the motor using supercharger suction air is employed.

Note that as in the above-described hybrid supercharger, the structure using the motor with the dedicated bearing for the motor can be employed. However, in the case of such a structure, a lubricant pipe and a compressed air pipe for oil throwing need to be additionally provided. Further, since the supercharger and the motor is each provided with the bearing, e.g., a diaphragm coupling is required to absorb axial displacement and misalignment between the supercharger and the motor. This increases a cost, leading to difficulty in retrofitting.

In the above-described background, for a supercharger employing the structure, such as a motor overhang structure, of attaching a motor to a silencer-side end portion of a rotor shaft connected to a compressor portion, it has been demanded to efficiently cool the motor using supercharger suction air as a cooling medium.

The present invention has been made to solve the above-described problem, and is intended to provide a supercharger which employs the structure of attaching a motor to a silencer-side end portion of a rotor shaft connected to a compressor portion and which is capable of efficiently cooling the motor using supercharger suction air as a cooling medium and to provide a method for cooling the motor of the supercharger.

Solution to Problem

In order to solve the above-described problem, the present invention employs the following solution.

A supercharger of a first aspect of the present invention is a supercharger in which a motor is attached to a silencer-side end portion of a rotor shaft connected to a compressor portion. Such a supercharger includes a suction air introduction path formed in a silencer such that a main suction air flow flows in the radial direction of the silencer toward a connection portion between the silencer and the compressor portion, and a cooling air intake path formed in the silencer in which at least an outlet thereof is on the center axis of the rotor shaft.

The supercharger of the first aspect of the present invention includes the suction air introduction path formed in the silencer such that the main suction air flow flows in the radial direction of the silencer toward the connection portion between the silencer and the compressor portion, and the cooling air intake path formed in the silencer in which at least the outlet thereof is on the center axis of the rotor shaft. With this configuration, the entire volume of the cooling suction air passing through the cooling air intake path is supplied to the motor provided on the same axis as the cooling air intake path, and part of supercharger suction air is supplied to the inside and periphery of the motor. Thus, cooling can be efficiently performed.

In the supercharger of the above-described aspect, the suction air introduction path preferably includes an inclined wall configured to guide the main suction air flow toward the center of the motor. With this configuration, the volume of the main suction air flow supplied to the motor increases, and therefore, the efficiency of cooling the motor can be improved.

The supercharger of the above-described aspect preferably further includes a cooling air introduction path which is provided at a silencer-side end portion of the motor and whose diameter is reduced to guide the main suction air flow toward the center of the motor. With this configuration, it can be ensured that the supercharger suction air can be guided into the motor.

In the supercharger of the above-described aspect, the motor includes a cylindrical housing, a stator housed in the housing, and a motor rotor including a permanent magnet and connected to an end portion of the rotor shaft to rotate in the stator, an inner peripheral surface of the housing is provided with one or more recessed grooves, and thermal grease is applied to the inner peripheral surface and the recessed grooves. With this configuration, heat dissipation from the housing can be improved.

In this case, a heat dissipation fin may be provided on an outer wall surface of the housing. With this configuration, heat dissipation from the housing can be further improved.

A method for cooling a motor of a supercharger according to a second aspect of the present invention is the method for cooling a motor of a supercharger in which the motor is attached to a silencer-side end portion of a rotor shaft having a turbine portion and a compressor portion. Such a method includes cooling the motor by a main suction air flow introduced through an air intake port of a silencer and passing through a suction air introduction path and a cooling suction air passing through a cooling air intake path formed in the silencer in which at least an outlet thereof is on the center axis of the rotor shaft.

In the method for cooling the motor of the supercharger according to the second aspect of the present invention, the motor is cooled by the main suction air flow introduced through the air intake port of the silencer and passing through the suction air introduction path and the cooling suction air passing through the cooling air intake path formed in the silencer in which at least the outlet thereof is on the center axis of the rotor shaft. With this configuration, the entire volume of the cooling suction air passing through the cooling air intake path is supplied to the motor provided on the same axis as the cooling air intake path, and part of supercharger suction air is supplied to the inside and periphery of the motor. Thus, cooling can be efficiently performed.

Advantageous Effects of Invention

According to the present invention as described above, in the supercharger with the structure of attaching the motor to the silencer-side end portion of the rotor shaft connected to the compressor portion, part of the supercharger suction air is used as a cooling medium for the motor, and therefore, it can be ensured that the motor is efficiently cooled. As a result, a significant advantageous effect leading to improvement of the reliability and durability of the supercharger with the motor can be provided.

DESCRIPTION OF EMBODIMENTS

A supercharger and a motor cooling method according to an embodiment of the present invention will be described below with reference to drawings.

Figure 4:
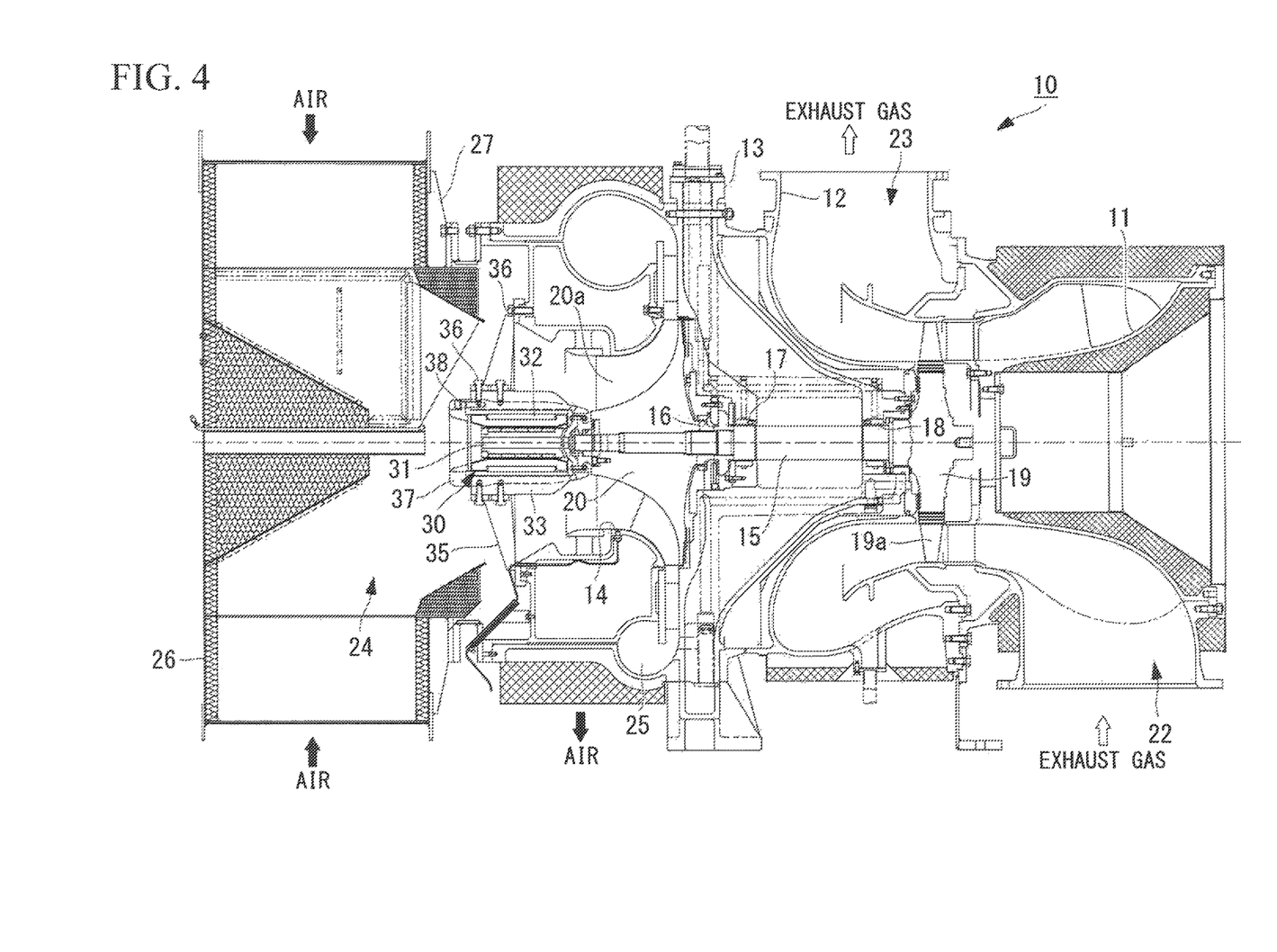
FIG. 4 is a longitudinal sectional view of a schematic configuration example of the supercharger of the present invention.

FIG. 4 is a longitudinal sectional view of a schematic configuration example of an electric-assist supercharger as an example of the supercharger of the present invention. The illustrated electric-assist supercharger (hereinafter referred to as a "supercharger") 10 is the device provided at, e.g., a not-shown marine diesel engine (e.g., a low-speed two-cycle diesel engine) and configured to supply compressed air to an intake manifold (not shown) communicating with the inside of a cylinder liner (not shown) forming the marine diesel engine.

As illustrated in FIG. 4, the supercharger 10 of the present embodiment is configured such that a gas inlet casing 11, a gas outlet casing 12, a bearing pedestal 13, and a compressor-side air inlet casing 14 are fastened together with bolts (not shown). A rotor shaft 15 is rotatably supported by a thrust bearing 16 and radial bearings 17, 18 provided in the bearing pedestal 13. One end portion of the rotor shaft 15 is provided with a turbine 19 forming a turbine portion, and the other end portion of the rotor shaft 15 is provided with a compressor impeller (an impeller) 20 forming a compressor portion.

The turbine 19 includes many blades 19a at the outer periphery thereof. The blades 19a are provided between an exhaust gas introduction path 22 formed in the gas inlet casing 11 and an exhaust gas discharge path 23 formed in the gas outlet casing 12.

On the other hand, the compressor impeller 20 includes many blades 20a at the outer periphery thereof. The blades 20a are arranged downstream of a suction air introduction path (a suction air flow path) 24 formed in the air inlet casing 14 forming part of a supercharger casing. The suction air introduction path 24 is connected to a scroll chamber 25 via the compressor impeller 20, and the scroll chamber 25 is further connected to a combustion chamber of the engine via a not-shown suction air introduction path.

The above-described supercharger 10 includes a silencer 26 upstream of the suction air introduction path 24. The silencer 26 is placed at the former stage (the upstream side) at which suction air to be compressed by the compressor portion is sucked into the suction air introduction path 24, i.e., upstream of an inlet of the suction air introduction path 24. The silencer 26 has the filter function of allowing passage of suction air to rectify an air flow and the noise canceling function of absorbing noise caused due to air suction. The silencer 26 is supported by the air inlet casing 14 via an intermediate piece 27.

The supercharger 10 of the present embodiment further includes a motor 30 connected to the rotor shaft 15. The motor 30 is a motor whose size is reduced in such a manner that the function of generating power by a motor generator used for a hybrid supercharger is omitted and that the function of the motor is narrowed down to an electric operation function. Thus, the motor 30 has the structure in which the rotor shaft 15 is attached to extend toward the suction air introduction path 24, i.e., the motor overhang structure in which no dedicated bearing for the motor 30 is provided. Thus, the motor 30 and a later-described motor rotor 31 thereof are supported by the thrust bearing 16 and the radial bearings 17, 18 supporting the rotor shaft 15.

Figure 5:
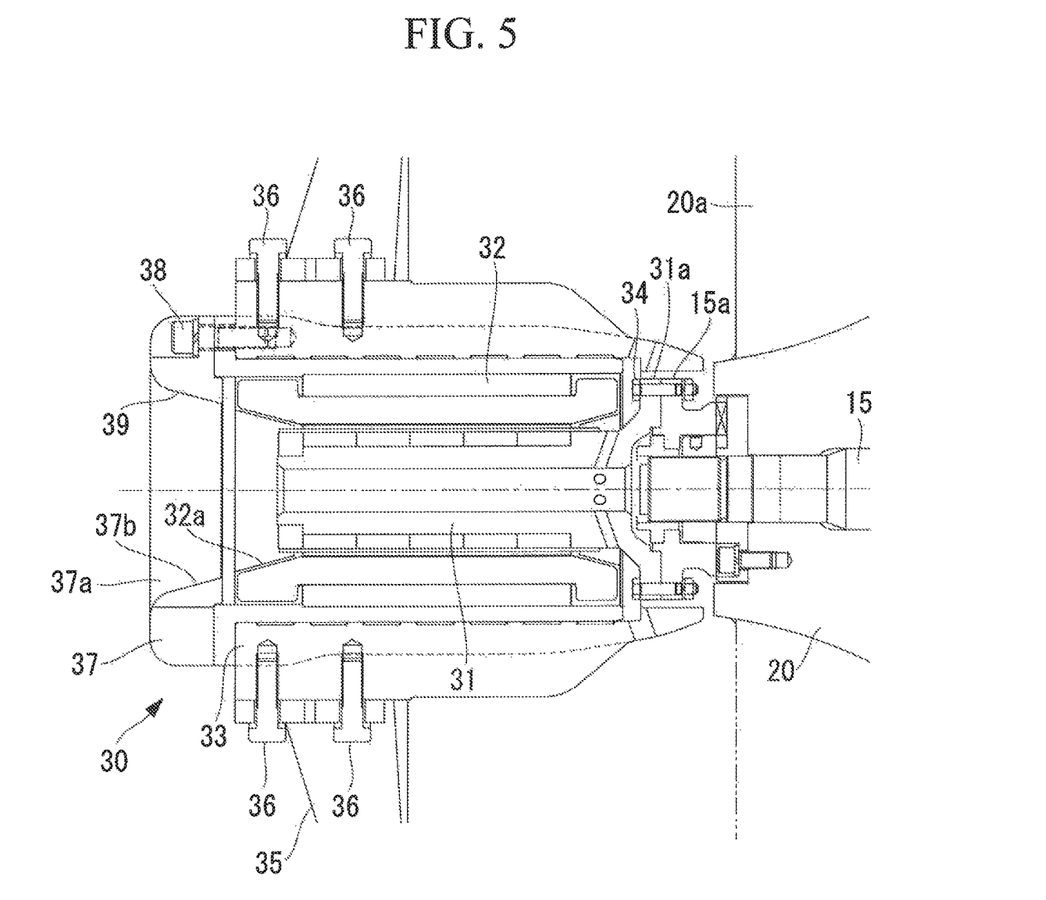
FIG. 5 is an enlarged view of the periphery of the motor of the supercharger illustrated in FIG. 4.

FIG. 5 is an enlarged view of the periphery of the motor 30 described above.

The motor 30 includes, as main components, the motor rotor 31, a stator 32, and a housing 33. Of these components, the motor rotor 31 is a circular cylindrical member including a permanent magnet on the outer peripheral surface thereof. On end portion of the motor rotor 31 is connected to an end portion of the rotor shaft 15 by flange coupling. Such flange coupling joins, with a plurality of bolt nuts 34, a flange 15a provided at the end portion of the rotor shaft 15 close to the suction air introduction path 24 (the left side as viewed in FIG. 5) to a flange 31a provided at the end portion of the motor rotor 31 close to the compressor impeller 20 (the right side as viewed in FIG. 5).

The stator 32 is housed and placed in the cylindrical housing 33. As illustrated in FIG. 4, the housing 33 is supported by the air inlet casing 14 via a support member 35. Note that with hexagonal bolts 36, the support member 35 and the air inlet casing 14 are coupled together and the support member 35 and the housing 33 are coupled together.

At a hollow portion of the stator 32, the motor rotor 31 passing through a center portion of the stator 32 is disposed so as not to contact the stator 32.

A cap 37 is, with a hexagonal socket head cap bolt 38, fixed and attached to the tip end portion of the housing 33 close to the suction air introduction path 24. The cap 37 is positioned to extend from the silencer 26 toward the compressor impeller 20, and a center portion of the cap 37 is provided with a circular opening 37a. That is, the size of the motor 30 is reduced to such an extent that an extension of the rotor shaft 15 does not reach the silencer 26.

In the supercharger 10 having the above-described configuration, the motor 30 whose temperature increases in operation needs to be cooled. For this reason, in the present embodiment, the motor 30 is cooled using part of supercharger suction air.

Figure 1:
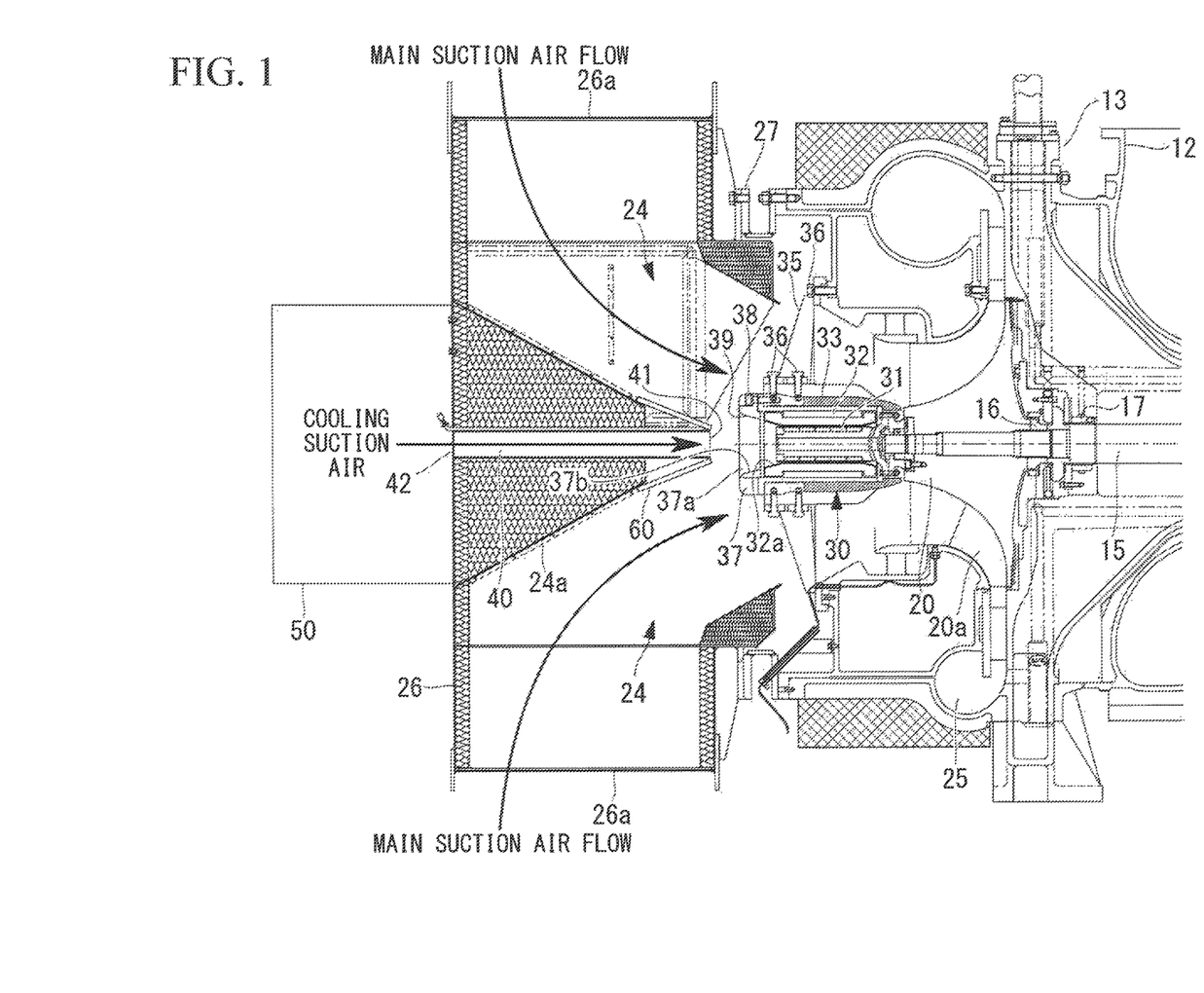
FIG. 1 is a sectional view of a main portion of an embodiment of a supercharger and a motor cooling method according to the present invention.
Figure 2:
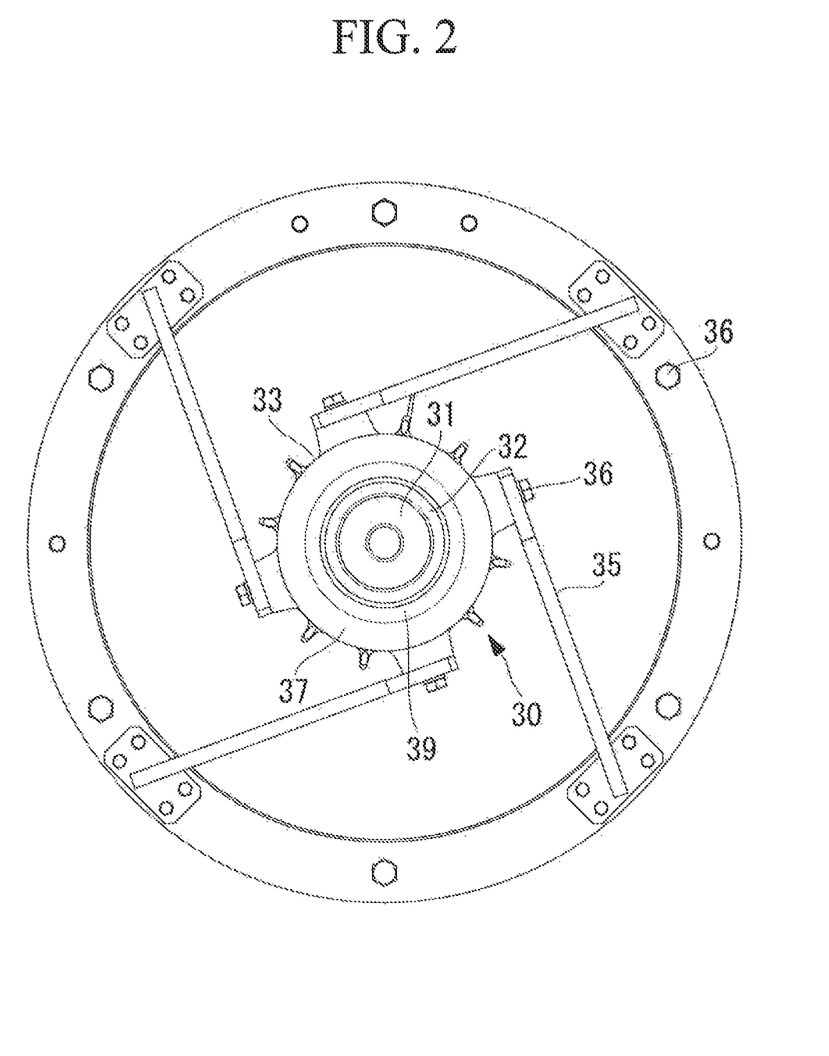
FIG. 2 is a left side view of FIG. 1 when a motor attached to a predetermined position is viewed from a silencer side.

The supercharger suction air used for cooling of the motor 30 includes, as illustrated in FIG. 1, a main suction air flow introduced through each air intake port 26a of the silencer 26 to pass through the suction air introduction path 24, and cooling suction air passing through a cooling air intake path 40 passing through the center of the silencer 26 in the axial direction thereof and formed on the center axis of the rotor shaft 15. That is, as the supercharger suction air, there are the main suction air flow sucked through the suction air introduction path 24 and the cooling suction air sucked through the cooling air intake path 40. The air flows (the main suction air flow and the cooling suction air) through different paths are joined together to flow into the air inlet casing 14. Note that the "cooling suction air" described herein is the name used for distinguishing the cooling suction air from the main suction air flow, and is not intended to limit the use application of such air only to cooling.

The main suction air flow flows into the suction air introduction path 24 through each air intake port 26a provided at the outer periphery of the silencer 26, and then, flows into the air inlet casing 14 in the axial direction of the rotor shaft 15. Part of the main suction air flow is, together with the cooling suction air, used for cooling of the motor 30. Note that not only the main suction air flow and the cooling suction air but also the air having used for cooling of the motor 30 are joined together in the air inlet casing 14, and then, are compressed by the compressor impeller 20.

Meanwhile, the cooling suction air flows into the air inlet casing 14 through the cooling air intake path 40. The cooling air intake path 40 penetrates the silencer 26 such that at least an outlet of the cooling air intake path 40 is on the center axis of the rotor shaft 15. The cooling air intake path 40 may linearly penetrate the silencer 26 such that the entirety of the cooling air intake path 40 is on the center axis of the rotor shaft 15. Thus, the outlet 41 of the cooling air intake path 40 opens to face the cap 37 of the motor 30 attached on the center axis of the rotor shaft 15. That is, the outlet 41 of the cooling air intake path 40 faces the opening 37a of the cap 37 on the center axis of the rotor shaft 15.

Note that an inlet 42 of the cooling air intake path 40 opens in a terminal stand 50 attached to an end surface of the silencer 26 in the axial direction thereof, and the cooling suction air is introduced through an air intake port (not shown) provided at a proper portion of an outer wall surface of the terminal stand 50. Depending on the method for forming the cooling air intake path 40, the inlet 42 of the cooling air intake path 40 may open at the position being not coincident with the center axis of the rotor shaft 15 and shifted from the center of the rotor shaft 15.

The entire volume of the inflow cooling suction air from the cooling air intake path 40 is supplied to the motor 30 provided on the same axis as the cooling air intake path 40. Specifically, the outlet 41 of the cooling air intake path 40 is on the same axis as the opening 37a of the cap 37 attached to the tip end portion of the motor 30. Thus, the cooling suction air flowing out from the linear cooling air intake path 40 flows straight such that the entire volume thereof flows into the motor 30 through the opening 37a. Moreover, part of the main suction air flow also joins the cooling suction air to flow into the motor 30 through the opening 37a.

The cooling suction air and part of the main suction air flow having flowed into the motor 30 pass through the clearance between the motor rotor 31 and the stator 32 to flow out from the side of the motor 30 opposite to the cap 37 toward the compressor impeller 20.

As a result, the cooling suction air and part of the main suction air flow passing and flowing through the inside of the motor 30 can be used for cooling by absorbing heat from the motor 30. Moreover, the majority of the main suction air flow passes and flows on the outer peripheral side of the motor 30, and therefore, such a main suction air flow can be also used for cooling by absorbing heat from the motor 30. Thus, in cooling of the motor 30 by using part of the supercharger suction air, a sufficient volume of cooling air passing through the inside and periphery of the motor 30 can be ensured. In particular, it can be ensured that the cooling suction air can be mainly introduced as the cooling air passing through the inside of the motor 30, leading to efficient cooling.

In the supercharger 10 of the above-described embodiment (see FIG. 1), the rotor-shaft-side outlet of the suction air introduction path 24 is extended, and an inclined wall 60 is provided to guide the main suction air flow toward the center of the motor 30. That is, the inclined wall 60 is configured as follows. Of a wall surface forming the suction air introduction path 24, an inclined surface of a flow path inner wall surface 24a extends to the outlet 41 of the cooling air intake path 40 on the side close to the rotor shaft 15. Note that it is not preferable that the inclined wall 60 protrudes toward the rotor shaft side (the right side as viewed in FIG.

1) beyond the outlet 41 of the cooling air intake path 40. This is because the inclined wall 60 blocks the flow of cooling suction air, and the cooling suction air cannot be properly guided into the motor 30.

Further, the inclined wall 60 may be set at such an angle that the extension thereof intersects the center axis of the rotor shaft 15 in the opening 37a of the cap 37 or in the vicinity of the opening 37a of the cap 37.

With such an inclined wall 60, the volume of the main suction air flow supplied to the motor 30 increases, and therefore, the volume of cooling air used for cooling the inside and periphery of the motor 30 increases. This can improve the efficiency of cooling the motor 30.

In addition, in the supercharger 10 of the above-described embodiment, a conical cooling air introduction path 39 whose diameter is reduced toward the compressor impeller 20 is preferably provided at the tip end portion of the motor 30 close to the silencer 26 so that part of the supercharger suction air and the cooling suction air can be guided toward the center of the motor 30. In the illustrated configuration example, an inner peripheral surface 37b forming the opening 37a of the cap 37 is continuous to an inner peripheral surface end portion 32a of the stator 32 to form the conical cooling air introduction path 39, as illustrated in FIGS. 1 and 5. However, the cooling air introduction path 39 may be partially formed only at the opening 37a of the cap 37.

With such a cooling air introduction path 39, it can be ensured that part of the supercharger suction air and the cooling suction air are guided into the motor 30. Thus, in the motor 30, a sufficient volume of air flows through the clearance between the motor rotor 31 and the stator 32, leading to efficient cooling.

Note that the inner peripheral surface end portion 32a of the stator 32 forms part of the cooling air introduction path 39, and therefore, it can be further ensured that air is guided to the clearance between the motor rotor 31 and the stator 32.

Figure 3A:
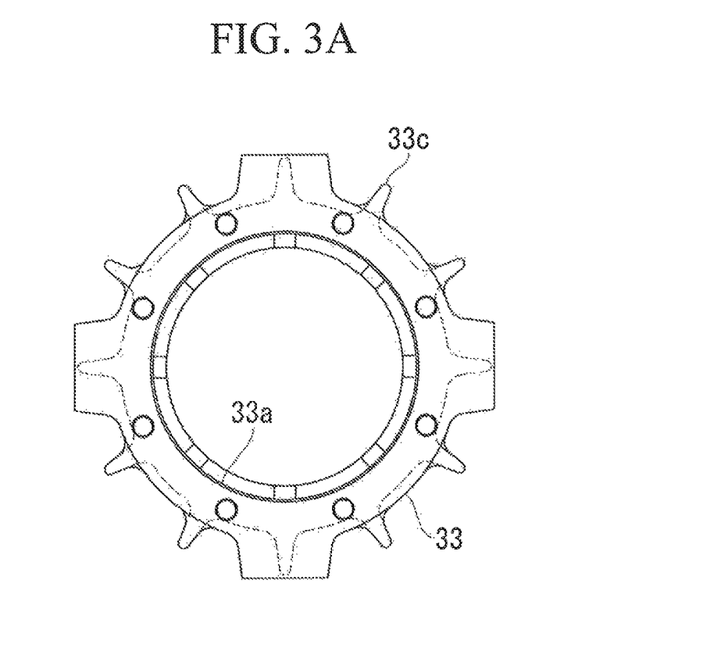
FIG. 3A is a left side view of a housing forming the motor.
Figure 3B:
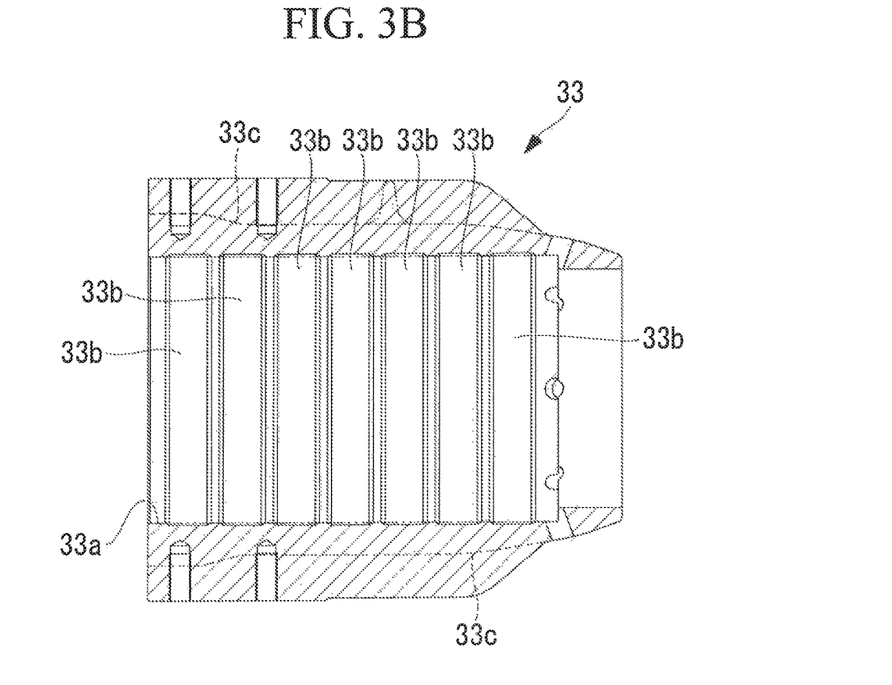
FIG. 3B is a longitudinal sectional view of the housing forming the motor.

Moreover, in the supercharger 10 of the above-described embodiment, as illustrated in, e.g., FIG. 3B, one or more recessed grooves 33b are preferably formed across the entirety of an inner peripheral surface 33a of the housing 33, and thermal grease is applied to the inner peripheral surface 33a and the recessed grooves 33b.

Specifically, the inner peripheral surface 33a of the housing 33 is provided with the plurality of recessed grooves 33b (seven in the present embodiment) formed in the axial direction across the entirety of the inner peripheral surface 33a. Heat dissipation from the housing 33 in operation is improved by the thermal grease thinly applied to the inner peripheral surface 33a and the recessed grooves 33b. Moreover, in order to improve heat dissipation from the housing 33, a plurality of heat dissipation fins 33c are provided on an outer peripheral surface of the housing 33.

As described above, the supercharger 10 of the present embodiment implements the following motor cooling method. The supercharger 10 uses, as the supercharger suction air, the main suction air flow introduced through the air intake port 26a of the silencer 26 and passing through the suction air introduction path 24 and the cooling suction air passing through the cooling air intake path 40 penetrating the center of the silencer 26 in the axial direction thereof such that at least the outlet of the suction air introduction path 24 is on the center axis of the rotor shaft 15. The motor 30 is cooled by using part of the supercharger suction air as cooling air.

Thus, in particular, the entire volume of the cooling suction air passing through the cooling air intake path 40 is supplied to the motor 30 provided on the same axis as the cooling air intake path 40. Since part of the supercharger suction air is supplied to the inside and periphery of the motor 30, cooling can be efficiently performed.

According to the above-described embodiment, the supercharger 10 employing the motor overhang structure uses, as the cooling medium for the motor 30, the cooling suction air passing through the cooling air intake path 40 and part of the supercharger suction air. Thus, it can be ensured that the motor 30 is efficiently cooled, leading to improvement of the reliability and durability of the supercharger 10.

Note that the present invention is not limited to the above-described embodiment, and changes can be optionally made without departing from the scope of the present invention.

REFERENCE SIGNS LIST 10 electric-assist supercharger (supercharger)
11 gas inlet casing
12 gas outlet casing
13 bearing pedestal
14 air inlet casing
15 rotor shaft
19 turbine
20 compressor impeller
22 exhaust gas introduction path
23 exhaust gas discharge path
24 suction air introduction path
25 scroll chamber
26 silencer
30 motor
31 motor rotor
32 stator
33 housing
33a inner peripheral surface
33b recessed groove
33c heat dissipation fin
35 support member
36 hexagonal bolt
37 cap
39 cooling air introduction path
40 cooling air intake path
60 inclined wall
FIG. 1
1 MAIN SUCTION AIR FLOW
2 COOLING SUCTION AIR
3 MAIN SUCTION AIR FLOW
FIG. 4
1 EXHAUST GAS
2 AIR
3 EXHAUST GAS
4 AIR
5 AIR

The invention claimed is:

1. A supercharger in which a motor including an opening to introduce cooling air thereto is attached to a silencer-side end portion of a rotor shaft connected to a compressor portion, the supercharger comprising:
    a suction air introduction path formed in a silencer such that a main suction air flow flows through an air intake port provided at an outer periphery in a radial direction of the silencer toward a connection portion between the silencer and the compressor portion; and
    a cooling air intake path formed in the silencer, in which at least an outlet thereof is on a center axis of the rotor shaft, and an inlet thereof is provided at an end portion of the silencer in an axial direction of the silencer, wherein the cooling air intake path extends linearly with a constant cross section and is on an axial centerline of the rotor shaft.

2. The supercharger of claim 1, wherein
the suction air introduction path includes an inclined wall configured to guide the main suction air flow toward a center of the motor.

3. The supercharger of claim 1, further comprising:
a cooling air introduction path which is provided at a silencer-side end of the opening portion of the motor and whose diameter is reduced to guide the main suction air flow toward the center of the motor.

4. The supercharger of claim 1, wherein
the motor includes;
a cylindrical housing,
a stator housed in the cylindrical housing, and
a motor rotor including a permanent magnet and connected to an end portion of the rotor shaft to rotate in the stator, and
an inner peripheral surface of the cylindrical housing is provided with one or more recessed grooves, and thermal grease is applied to the inner peripheral surface and the recessed grooves.

5. The supercharger of claim 4, wherein
a heat dissipation fin is provided on an outer wall surface of the cylindrical housing.

6. A method for cooling a motor of a supercharger in which the motor is attached to a silencer-side end portion of a rotor shaft including a turbine portion and a compressor portion, the method comprising:
cooling the motor by
a main suction air flow introduced through an air intake port provided at an outer periphery in a radial direction of a silencer and passing through a suction air introduction path, and
a cooling suction air passing through a cooling air intake path formed in the silencer, in which at least an outlet thereof is on a center axis of the rotor shaft, and an inlet thereof is provided at an end portion of the silencer in an axial direction of the silencer, wherein the cooling air intake path extends linearly with a constant cross section and is on an axial centerline of the rotor shaft.

7. The supercharger of claim 1, wherein
an inside of the suction air introduction path in the radial direction is formed by a flow path inner wall surface, and
the cooling air intake path is provided on an inside of the flow path inner wall surface in the radial direction.

* * * * *